(12) United States Patent
Persson

(10) Patent No.: US 10,894,491 B2
(45) Date of Patent: Jan. 19, 2021

(54) HARNESS SYSTEM WITH LOCKING MECHANISM

(71) Applicant: HOLMBERGS SAFETY SYSTEM HOLDING AB, Halmstad (SE)

(72) Inventor: Jan-Erik Persson, Vessigebro (SE)

(73) Assignee: HOLMBERGS SAFETY SYSTEM HOLDING AB, Halmstad (SE)

( * ) Notice: Subject to any disclaimer, the term of this patent is extended or adjusted under 35 U.S.C. 154(b) by 27 days.

(21) Appl. No.: 16/313,015

(22) PCT Filed: Jun. 22, 2017

(86) PCT No.: PCT/EP2017/065440
§ 371 (c)(1),
(2) Date: Dec. 22, 2018

(87) PCT Pub. No.: WO2017/220738
PCT Pub. Date: Dec. 28, 2017

(65) Prior Publication Data
US 2019/0232828 A1    Aug. 1, 2019

(30) Foreign Application Priority Data
Jun. 23, 2016   (SE) ...................................... 1650903

(51) Int. Cl.
*B60N 2/28*      (2006.01)
*B60R 22/357*   (2006.01)
(52) U.S. Cl.
CPC .......... *B60N 2/2812* (2013.01); *B60R 22/357* (2013.01)

(58) Field of Classification Search
CPC ........................... B60N 2/2812; B60R 22/357
See application file for complete search history.

(56) References Cited

U.S. PATENT DOCUMENTS

| 4,720,148 | A | * | 1/1988 | Anthony | ............... | B60R 22/357 |
|---|---|---|---|---|---|---|
| | | | | | | 297/474 |
| 5,398,997 | A | | 3/1995 | McFalls | | |
| 5,779,319 | A | * | 7/1998 | Merrick | ................ | B60R 22/357 |
| | | | | | | 297/250.1 |
| 8,944,503 | B2 | * | 2/2015 | Gates | ................... | B60N 2/2812 |
| | | | | | | 297/256.15 |

FOREIGN PATENT DOCUMENTS

EP          2391525 A1    12/2011

OTHER PUBLICATIONS

International Search Report dated Sep. 21, 2017 for PCT Application No. PCT/EP2017/065440.

* cited by examiner

*Primary Examiner* — Anthony D Barfield
(74) *Attorney, Agent, or Firm* — Moser Taboada

(57) ABSTRACT

An automatic harness system (1) for a child safety seat comprising one tensioning web (3); a retractor device (2) configured to allow tightening of the tensioning web (3), a locking mechanism, a release mechanism is connected to the retractor device (2). The release mechanism comprises an actuator, where a movement of the actuator from a first position to a second position alternates the release mechanism from the first state to the second state, and vice versa. The actuator's position allows a user to identify whether the release mechanism is in the first state or in the second state.

9 Claims, 6 Drawing Sheets

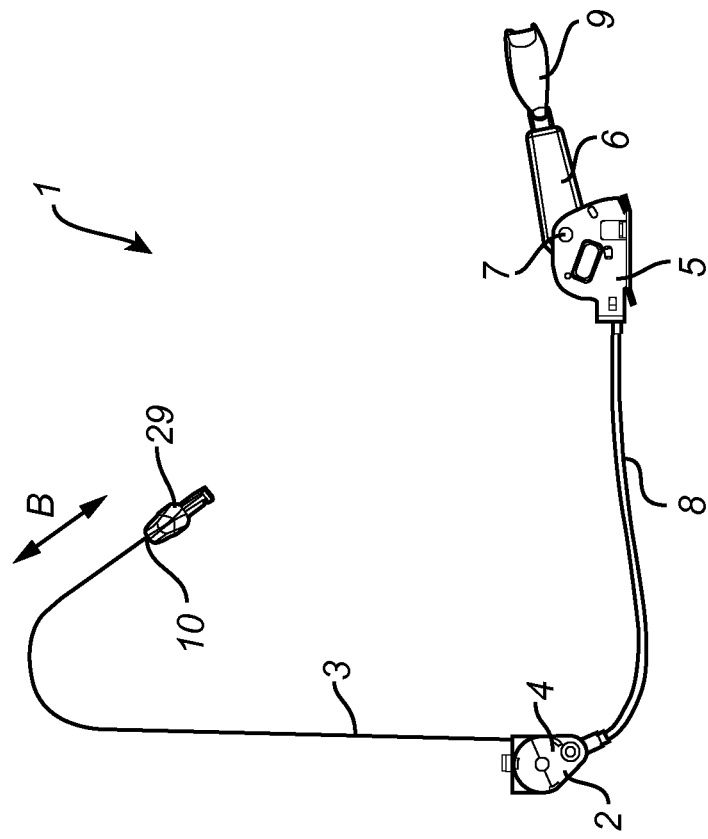
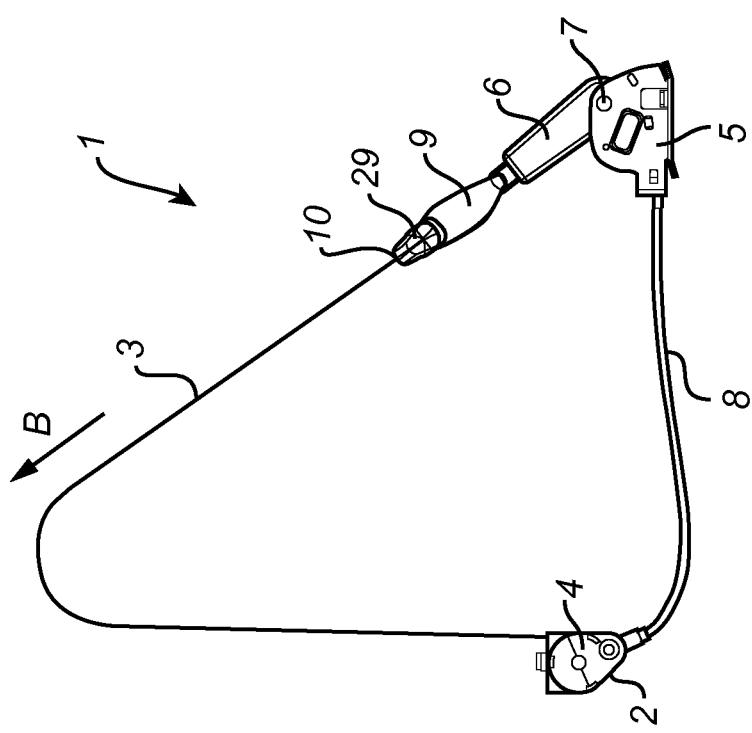

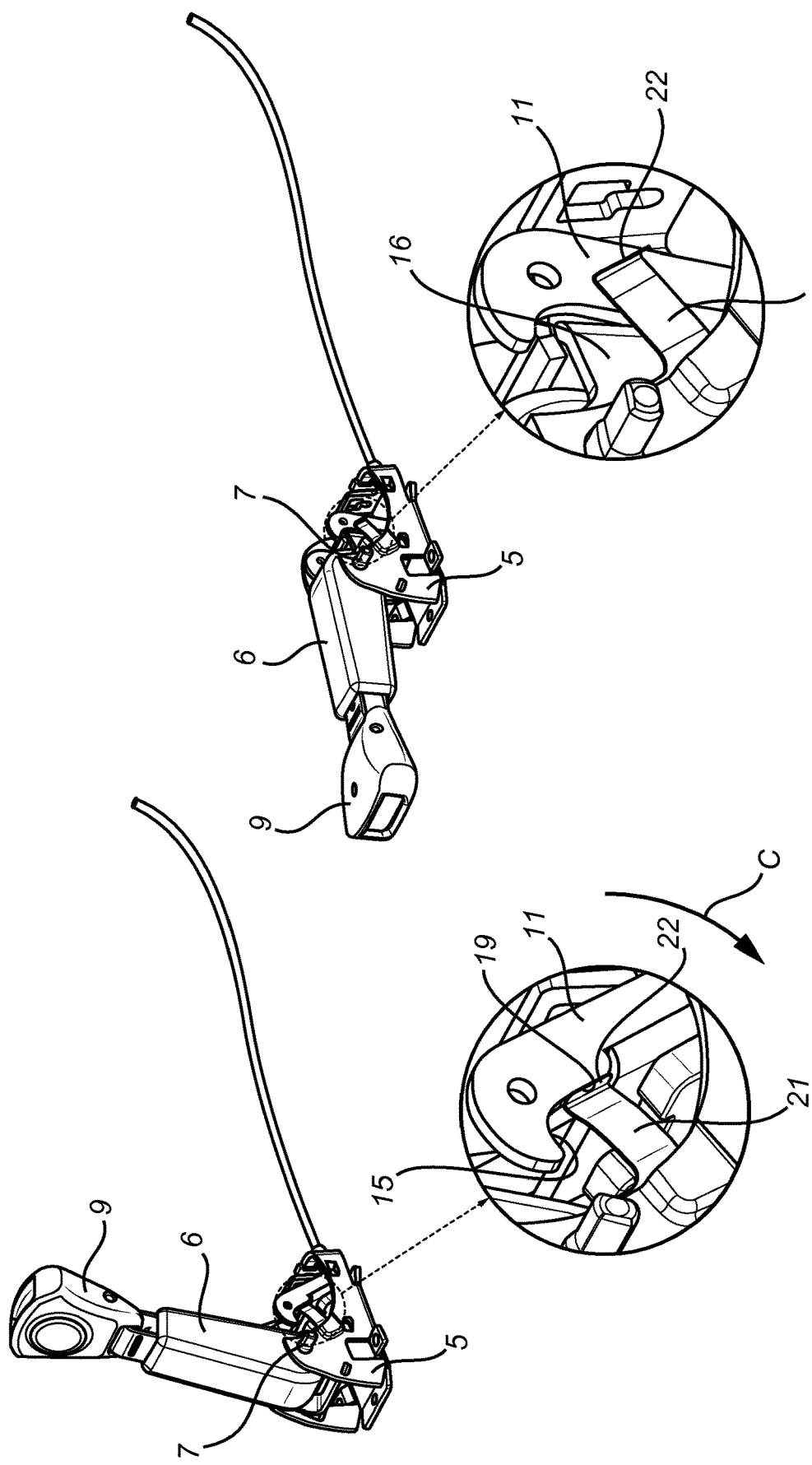

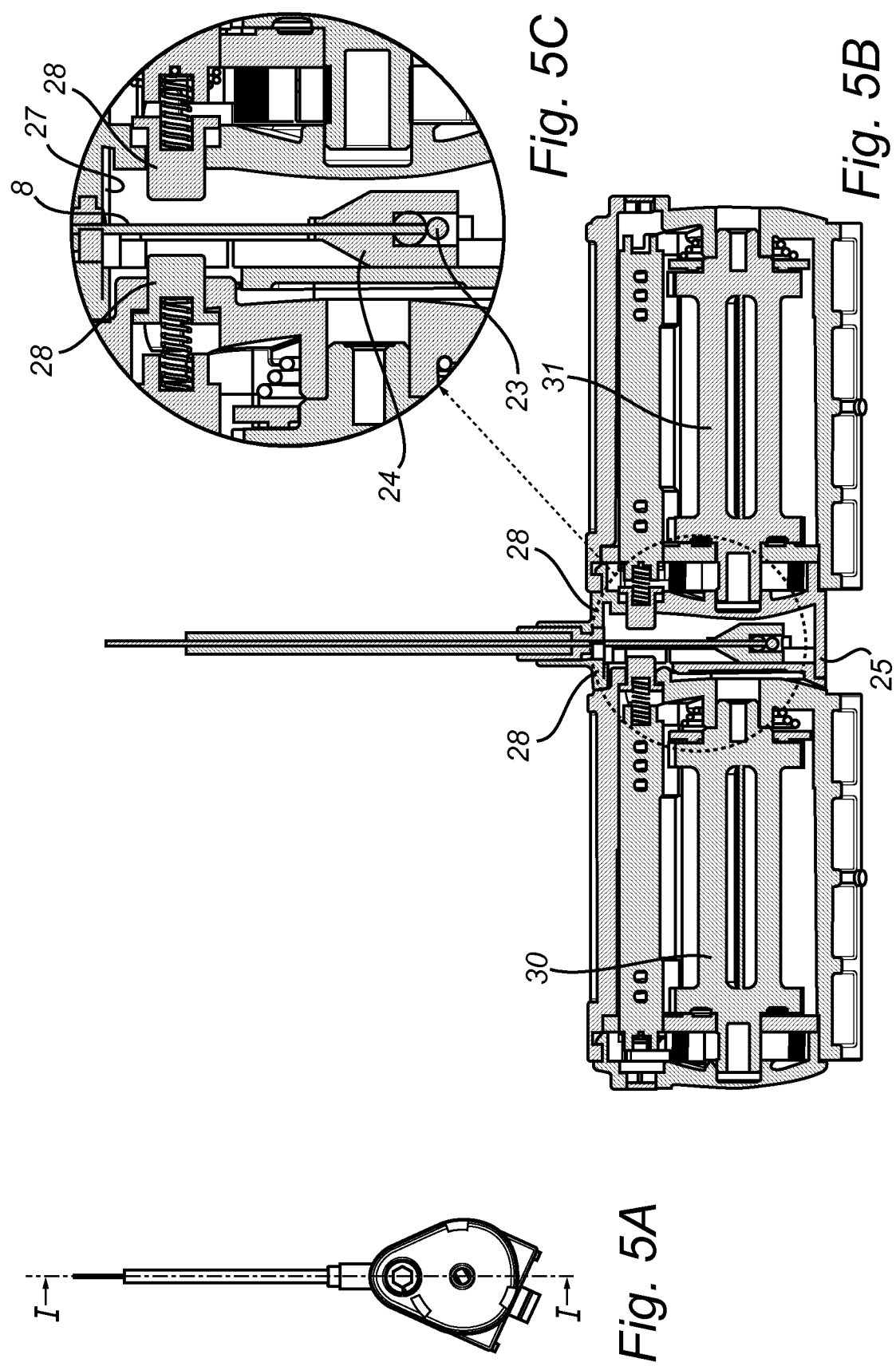

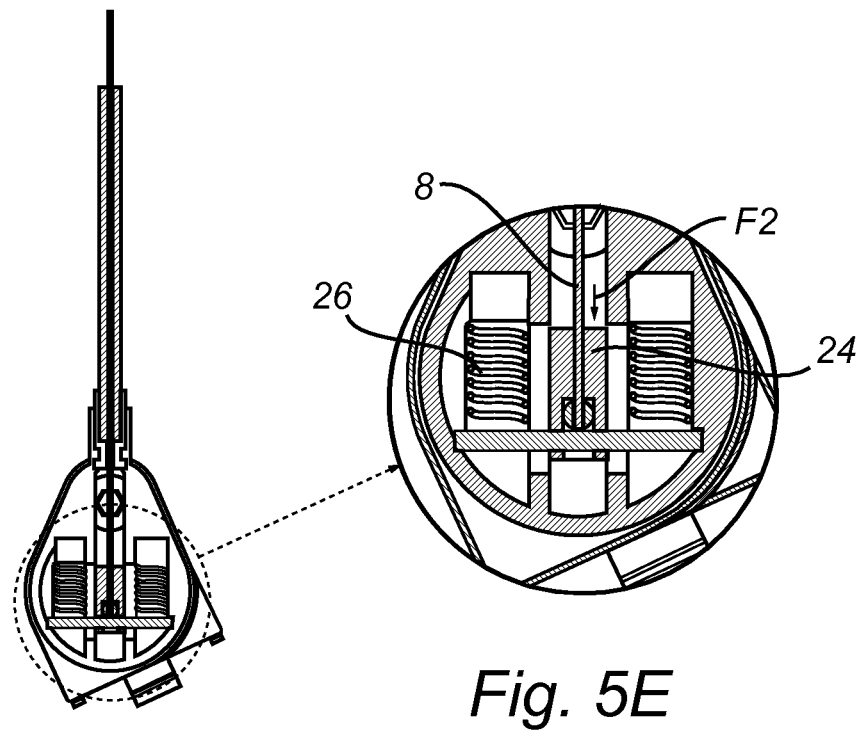
Fig. 5D
Fig. 5E
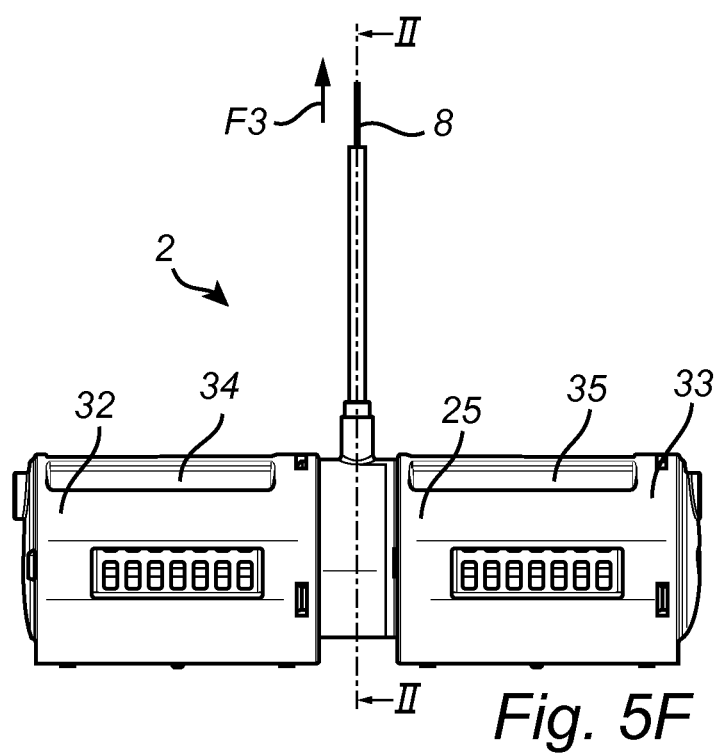
Fig. 5F

HARNESS SYSTEM WITH LOCKING MECHANISM

TECHNICAL FIELD

An automatic harness system for a child safety seat and a child safety seat comprising the same.

BACKGROUND

Child safety seats have become a mandatory part of safety systems for vehicles, when children of a certain height or weight are travelling in a vehicle, such as a car. The child safety seats are adapted to be used in a certain range of either weight or height, or a combination of the both, which means that the child seat must be adapted to be adjusted for the specific size or weight of the child using the seat. This adjustability may often be seen as having seats that have an adjustable neck brace, or that the harness system is adapted to be adjusted to the size of the child.

One common mistake parents or guardians of the child do when securing a child to a car seat is that the harness may not be adjusted correctly to the size of the child, which means that the harness may be too tight on the child, which results in the child becoming uncomfortable. A much more dangerous scenario is when the tension of the harness is too loose for the child, which may result in a situation where the movement of the child in a slack harness may result in an increased crash force, if the vehicle is involved in a crash.

Thus, there is a need to improve harness systems, in order to minimize the risk that a child, which itself is not aware of the risks, requirements and/or even faults of the system, is secured correctly to a child seat, where the parent and/or guardian can be certain that the efforts they have done to secure the child are correct, and the risk of faults is minimized.

U.S. Pat. No. 5,398,997 discloses a seat belt system for restraining a vehicle occupant having a retractor, a first locking tongue, a second locking tongue and a buckle. The retractor includes a spool which is rotatable in the webbing winding direction and a webbing unwinding direction, where the retractor further includes a lock bar which blocks rotation of the spool in the webbing unwinding direction when the first and the second locking tongue are connected with the buckle. This seat belt system is dependent on the buckle connectors being inserted in the buckle, where it is impossible for the user to identify whether or not the locking mechanism is actuated or not, when the buckle is assembled. I.e. if the locking mechanism is not actuated, by mistake, it is difficult for the user to identify this mistake.

EP 2 391 525 discloses a child safety seat having a harness retractor, where the system comprises a web and buckle connectors and a rotatable retractor mechanism, where a release mechanism connected between a locking device and the buckle housing is actuable to switch the locking device from a first positon to a second position permitting rotation of the retractor mechanism in the wind up direction. This harness retractor locking mechanism prevents the user to adjust the tensioning of the seatbelt when the seat locking mechanism has been engaged. This means that if the user has incorrectly tensioned the harness, the locking mechanism will prevent the user in adjusting the tension afterwards.

Thus there is a need to improve the harness systems for vehicles, and especially harness systems for child seats.

SUMMARY

In accordance with the invention there is provided, a harness system for a child safety seat comprising at least one tensioning web; a retractor device connected to a first end of the at least one tensioning web, the retractor device being configured to allow tightening of the tensioning web, thereby moving the tensioning web in a first direction, and the retractor device being configured to allow loosening of the tensioning web, thereby moving the tensioning web in a second direction; a locking mechanism comprising a first locking part that is connected to a second end of the tensioning web, and a second locking part that is configured to mate with the first locking part and secure the first locking part to the second locking part; a release mechanism connected to the retractor device, the release mechanism being configured to allow the retractor device to move the tensioning web in the first and the second direction when the release mechanism is in a first state, and the release mechanism being configured to prevent the retractor device to move the tensioning web in the second direction when the release mechanism is in a second state; where the release mechanism further comprises an actuator that is connected to the release mechanism, where a movement of the actuator from a first position to a second position alternates the release mechanism from the first state to the second state, and vice versa, characterised in that the actuator's position allows a user to identify whether the release mechanism is in the first state or in the second state.

The first part of the locking mechanism may be one or more buckle connectors and the second part of the locking mechanism may be a buckle housing.

The two states of the release mechanism allow the user to manipulate the harness system into a state where a child may be strapped into a child seat, where the tensioning web may both be released and tensioned, ensuring that the tensioning web is loose enough to allow the child to be securely and/or comfortably strapped in. When the child has been positioned in the seat, and the harness has been positioned loose enough for the child to be strapped in, the actuator may be manoeuvred into its second position, which causes the retractor device to prevent the tensioning web from becoming any looser. Thus, the locking device may be engaged, and the tensioning web may be further adjusted to become tighter around the child, but it prevents it in becoming looser. Thus, if an accident occurs, the retraction device will ensure that the tensioning web will not loosen during the accident, and the child is safe in its child seat.

By arranging the harness system so that the user can view whether or not the actuator is in its second position, ensures that the user can be reassured that the harness system is in its correct state when the vehicle enters into transportation mode. If the actuator would not be visible, the user would have to test the harness system rigorously every time the child is strapped into the seat, in order to be certain that the system is in its correct state, and that the child seat is safe for the child during transportation.

This allows the tensioning web to be in a retracted state and the actuator, as well as the second locking part to be positioned out of the way when a child is placed in a child seat. Thus, the parent or guardian does not have to move the harness system away from the areas of the child seat where the child is to be placed. The retracting device may ensure that the tensioning web is fully retracted (wound up), when there are no external forces applied to the web, and the second position of the actuator may be adapted to be in such a way that it may be positioned away from the seating area of the child seat.

Furthermore, the present invention allows for a child seat to automatically adjust/retract during use, e.g. when a child is positioned in a large winter jacket and the jacket compresses during use. Thus, the total volume of the dressed child may reduce during use, and the present invention ensures that a reduced force applied to the tensioning web may cause the retractor device to wind up the tensioning web further during use.

When the release mechanism is in its second state, it may allow the retractor device to move the tensioning web in the first direction when the release mechanism is in the second state, while it is preventing the retractor device to move the tensioning web in the second direction.

Within the scope of the present invention, the harness system may comprise two or more tensioning webs, with corresponding retractor devices and the relevant parts of the release mechanisms. It may be advantageous when having two or more tensioning webs and corresponding retractor devices, that the release mechanism is connected to one actuator, so that the locking of the release mechanisms may be controlled by a single actuator.

Within the scope of the present invention, the term "a first locking mechanism that is connected to the second end of the tensioning web" means that the first locking mechanism may be directly or indirectly connected to the second end of the tensioning web. This means that the locking mechanism may be attached to the second end of the tensioning web, but may also mean that an intermediate harness or part of the harness system may be between the first locking mechanism and the second end of the tensioning web. One consideration is that a pulling force may be transferred between the first locking mechanism and the second end of the tensioning web.

Within the scope of the invention the retractor device may be a quick adjuster, or similar devices known by the person skilled in the art.

In accordance with the invention, the term "release mechanism" may be seen as any element that may contribute to the retractor mechanism to be prevented to unwind the tensioning web, while allowing the wind up of the tensioning web, as well as selectively allowing the tensioning web to unwind.

In one embodiment the release mechanism may comprise a latch device positioned in the retractor device which in a first position secures the release mechanism in its first state and a second position secures the release mechanism in its second state. In accordance with the present invention, the first and second state of the release mechanism, may be transferred to the retractor device, so the retractor device is configured to in a first position to secures the retractor device in its first state and a second position secures the retractor device in its second state. The retractor device may be a resiliently loaded spool, where the resilience provides a pulling force onto the tensioning web so that when a force is applied to the tensioning web that is less than the resilient force, the web will be loaded onto the spool. However, when the retractor device is in its first state and the force applied to the web is higher than the resilient force, the web may be reeled out from the spool and the spool supplies an increased length of web outside the spool. By arranging a latch device in the retractor device, it is possible to change the mode of the retractor device from its first state to its second state, and vice versa in close proximity to the spool so that the latch may be in direct mechanical communication with the spool of the retraction device, and thereby reducing the risk of mechanical failure as the latch is in direct communication with the retraction device.

In one embodiment the release mechanism may be resiliently biased in its second state. This means that the release mechanism must actively be activated in order to come into the first state, where the retractor device allows movement of the web in more than one direction. Thus, the release mechanism will always seek to operate in its second state, which means that the risk of a failure of the release mechanism, allowing the release mechanism to unintentionally change from the second state to the first state, is minimised. The resiliently biased release mechanism ensures that if there is a failure in a connection between the actuator and the retractor device, the retractor device will always seek to go into its safe mode, which is in its second state. Thus, if there is a failure, the risk for the failure of the retractor device is minimized, and the tensioning web may be prevented from travelling in a direction out of the retractor device, and the child may maintain its safe position when sitting securely in the child seat. Thus, in the event of a crash, there is a virtually no risk that the tensioning web will travel out of the retractor device (unwind), and thereby preventing that the child might loosen in the harness system.

In one embodiment the actuator is an elongated member having a distal end and a proximal end, where the proximal end of the elongated member is configured to be pivotally connected to the child safety seat and the distal end comprises the second locking part. By providing an actuator that is connected to the child seat and is visible for the user it is possible for the user to easily recognize whether or not the actuator has activated the first and/or the second state of the release mechanism of the harness system. Furthermore, by pivotally connecting the actuator to the child seat and placing the second locking member on the free end, it is possible to arrange the actuator in such a way that when the release mechanism is in its first state, it is impossible, or at least difficult, to connect the first locking mechanism to the second locking mechanism, without rotating it into a position where the second state of the release mechanism is activated. The actuator may be attached to the child seat in such a way that the actuator is adapted to pivotally rotate in a direction away from the child seat, so that the first state is activated when the actuator is rotated away from the child seat, while the second state is activated when the actuator and the locking mechanism is rotated towards the seat and a child that may be sitting in the seat. Thus, when the second state is activated, the actuator is positioned in a way where it is natural for the second locking mechanism to mate with the first locking mechanism.

In one embodiment the actuator may be spring loaded in such a way that when the actuator is released, it will automatically rotate into a position that activates the first state, where this position may be adapted to be in a direction away from the seat. However, as the retractor device also may be spring loaded, and is adapted to retract the tensioning web, the retractor device may be spring loaded to such a degree that the spring loading of the retractor device is higher than the spring loading of the actuator. Thus, if the first locking mechanism is connected to the second locking mechanism, the retractor device will be capable of moving the actuator into its second position activating the second state of the release mechanism. Thus, if the locking devices have been mated, the retractor device will force the actuator into its second state, and when the release mechanism has transitioned into its second state, the release mechanism will prevent the actuator to be moved back into its first state, due to the fact that the release mechanism prevents the tensioning web to be pulled out of the retractor device. Thus, a child using the seat or a user would not be able to move the actuator from its second state to its first state without releasing the locking mechanism, i.e. unclasping the locking buckle of the first tensioning web from a mating buckle connector clasp of the actuator.

In one embodiment the release mechanism may comprise a release arm that is adapted to be biased by the actuator and is coupled to the retractor device for securing the retractor device in its first state and/or in its second state. The actuator may be adapted to be moved from a first position to its second position, and vice versa, where the actuator may be attached in a single connection to the safety seat. Thus, the movement of the actuator may be transferred to the release mechanism either directly, or via a release arm, which is adapted to be biased from a first position to a second position, and vice versa by the actuator. Thus the movement of the actuator may be utilised to move the release arm to its correlated positions, which thereby is translated to the release mechanism to activate the first state and/or the second state. By providing a release arm it is possible to isolate the actuator from direct communication from the release mechanism, so that unintentional movement of the actuator may intentionally be isolated from the release mechanism. Such a situation might occur in a crash, where the impact may cause the actuator to move slightly in a direction towards its first position. By providing a release arm it may be ensured that the slight movement of the actuator is not transferred to the release mechanism and the risk of unintentional release of the tensioning web is minimized or prevented altogether. Thus, the release arm may also be utilised to only transfer the movement of the actuator into its open position, when the actuator has been fully moved into its first position, and that no movement of the actuator is not transferred until the actuator reaches its ultimate first position. Thus any force caused by the transitional movement of the actuator between its second and its first position is isolated from the release mechanism.

In one embodiment the release mechanism may comprise a security member that is separate from the actuator which in a securing position prevents the release mechanism to move into its first state when the actuator is in is second position, and in an open position allows the release mechanism to operate in its first state. By providing a security member, that actively secures the release mechanism from opening, there is provided a redundancy into the release mechanism. The security member may e.g. be used to maintain the release arm in its secure position, i.e. its second position, or may be used to provide a second lock in the retractor device. Thus, in the event of a crash, the security member may provide a second line of defence should the impact be of the kind where the force is so great that the release arm could unintentionally be moved or if the release mechanism in the retractor would fail.

In one embodiment the actuator may be coupled to the security member and where the actuator is configured to move the security member from its securing position to its open position and vice versa. This means that the redundant security feature of the release mechanism can only be released if the actuator is moved into its first position. Thus, if the actuator has not been moved from its second position, the security member will remain in place and will ensure that release mechanism is not unintentionally activated from its second secure state to its first open state. Thus, it is ensured that the redundant safety feature will not be deactivated and the release mechanism cannot open, until the actuator has been moved into its first position.

In one embodiment the release mechanism may comprise a first release module and/or a second release module that is arranged in the base of the child seat. By providing a first and/or a second release module, it may be possible to isolate some functions of the release mechanism in one place of the child seat, ensuring that a potential failure in the first release module and/or the second release module may not be transferred to another part of the release module. The first release module may e.g. comprise the actuator, a release arm, a redundant safety member, the first locking mechanism, a housing that may carry the elements of the first module and be adapted to be positioned between the legs of the person using the seat. The second release module may comprise the retractor device, the release mechanism, a redundant safety member, the tensioning web, as well as the second locking member, as well as a housing to hold the elements of the second release module.

In one embodiment the first release module may be coupled to the second release module via a release cable that is adapted to transfer force applied in the first release module to the second release module and vice versa. By isolating the first release module from the second release module, and coupling the two modules together using a cable, it may be possible to isolate any faults that may occur in the first module, the second module and/or the cable, from affecting the other elements of the release mechanism. To that effect, the cable may be spring loaded, where the spring may be located in the retractor device, and where the spring forces the locking mechanism to maintain the retractor device the second state. Thus, if the cable is cut or breaks during a crash, the spring will ensure that the retractor device does not allow the tensioning web to be moved in its second direction, i.e. to be released or rolled out from the retractor device. The spring force of the cable may be adapted in such a way so that the resilient force of the spring of the cable is less than the resilient force of the actuator, so when the actuator is resiliently moved into its first position, the resilient force of the actuator is greater than the resilient force of the cable spring, which means that the cable spring will not prevent the actuator from moving into its first position and allows the second state of the release mechanism to be activated.

The invention also relates to a child safety seat comprising a harness system in accordance with the above.

BRIEF DESCRIPTION OF THE DRAWINGS

The invention is explained in detail below with reference to the drawings, in which FIGS. 1A and 1B shows a side view of a harness system in accordance with the invention, FIGS. 4A and 4B show a perspective view of a security member in accordance with the invention, and FIG. 5A-F show the retractor device from the side, sectional, detailed sectional, front and front sectional respectively.

DETAILED DESCRIPTION

Figure 2A:
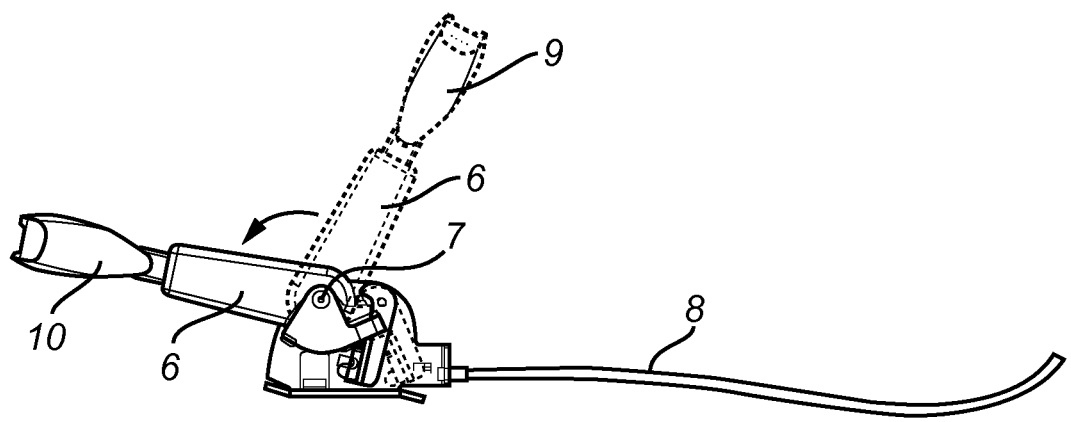
FIG. 2A-C show a side view of embodiment of the actuator in accordance with the invention.

FIG. 1A is a side view of a harness system 1 in accordance with the invention, where the harness system 1 comprises a retractor device 2 that may be implemented in a back of a child safety seat (not shown), a tensioning web 3 that is connected to the retractor device 2, where the retractor device is provided with a spool mechanism 4 where the tensioning web 3 may be fed out of it in an outwards direction (unwind direction) or into in an inwards direction (wind up direction).

The harness system 1 further comprises a first module housing 5, which comprises an actuator arm 6 that is pivotally connected at a pivot point 7 to the housing 5. The housing 5 may be adapted to be positioned in the base of the safety seat (not shown) where it may be adapted to be positioned between the legs, close to the crotch of the user. The housing 5 may be mechanically connected to the retractor device via a cable 8, where a movement of the actuator arm 6 may be translated into a force that is fed via the cable 8 to the retractor device. The tensioning web 3 may be connected to a locking mechanism 9 of the actuator arm via mating locking device 29, so that the free end 10 of the tensioning web is securely coupled to the locking mechanism 9. The locking mechanism 9 may be provided with a switch, a button, or a discharge mechanism, that selectively releases the locking device from the locking mechanism 9.

The actuator arm 6 may be pivoted from its first position, shown in FIG. 1B to a second position, shown in FIG. 1A, where the position of the actuator arm is translated to the retractor device 2, activating a function of the retractor device, where in a first state the retractor device allows the tensioning web 3 to be extended from the retractor device 2 and allows it to be retracted into the retractor device, in the directions shown by arrow B of FIG. 1B.

FIG. 1A shows the harness system in its second state, where the actuator arm 6 has been manoeuvred to pivot to its second position. The movement of the actuator arm 6 translates a force via the cable 8 towards the retractor device, where a release mechanism prevents the retractor device from allowing the tensioning web 3 to be unwound from the retractor device. When the actuator arm 6 has been moved into its second position, the locking device 29 attached to the free end 10 of the tensioning web may be inserted into the locking mechanism 9, securing a mechanical connection between the retractor device 2 and the actuator arm 6 via the tensioning web 3.

The first state of the release mechanism and the harness system, as shown in FIG. 1B, allows the person that is to be secured in the safety seat to be positioned in the seat (not shown) and allows the tensioning web to be discharged to a degree where the tensioning web is adapted to envelop the person in the seat. When the tensioning web has been released to a suitable length, the actuator arm 6 may be pivoted into its second position, as shown in FIG. 1A, and the locking device is secured to the locking mechanism 10. The pivoting of the actuator arm 6 into its second position causes the retractor device to prevent that the tensioning web may be pulled out further, but may be resiliently pulled into the retractor device in the direction B shown in FIG. 1A, so that the tensioning web is tightened correctly to the body of the person sitting in the seat.

As the tensioning web 3 is attached to the actuator arm 6 and cannot be loosened, the tensioning web will ensure that the actuator arm will not be able to pivot back to its first position until the locking device has been released from the locking mechanism 9.

Thus, when a caretaker or a parent of a child using the safety seat has strapped the child in and secured the first locking device with the locking mechanism 9, and the tightness of the straps (tensioning web) has been checked, the caretaker is certain that the child cannot come loose from the seat, in that the person can identify that the actuator arm 6 is in its second position, which prevents the straps to be loosened.

Figure 2B:
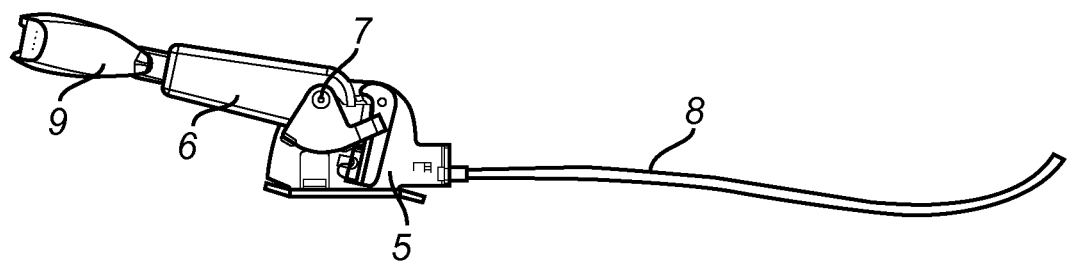
Figure 2C:
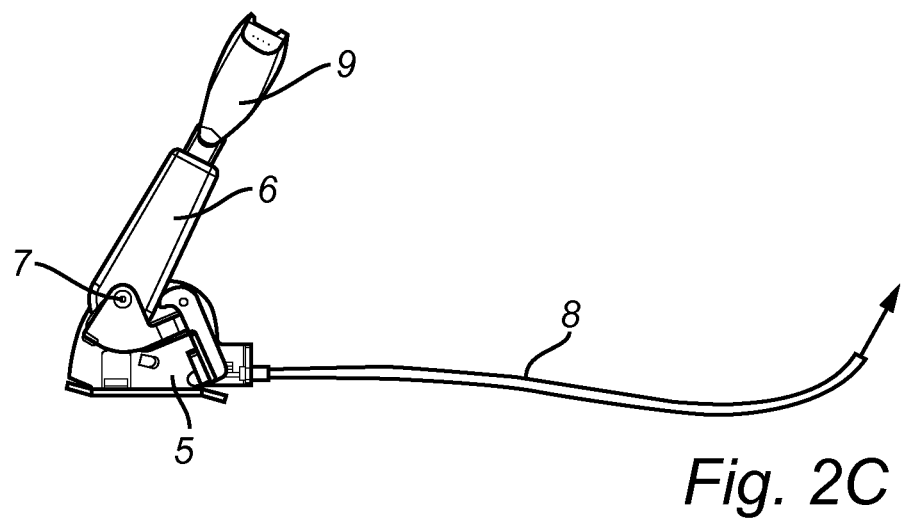

FIG. 2A-2C shows the housing 5 and the actuator arm 6 in different positions. The actuator arm 6 is adapted to rotate around a pivot point 7, so that the free end of the actuator arm may be moved from an upright position (shown in FIG. 2C) where the actuator arm locks the retractor device in its second state to a flat position (shown in FIG. 2B) where the tensioning web is allowed to feed into the retractor device as well as feed out of the retractor device.

The movement of the actuator arm 6 may be spring loaded, so that there is a continuous force F1 applied to the actuator arm attempting to rotate the actuator arm 6 into its flat position from its upright position, and thereby releasing the tensioning web to be loosened. The force F1 is of such magnitude that it does not apply a significant amount of torque to the tensioning web, when the web is secured to the actuator arm 6. However, when the tensioning web is released, and the no external force is applied to the arm, the force is great enough to force the actuator arm into its flat position.

Figure 3A:
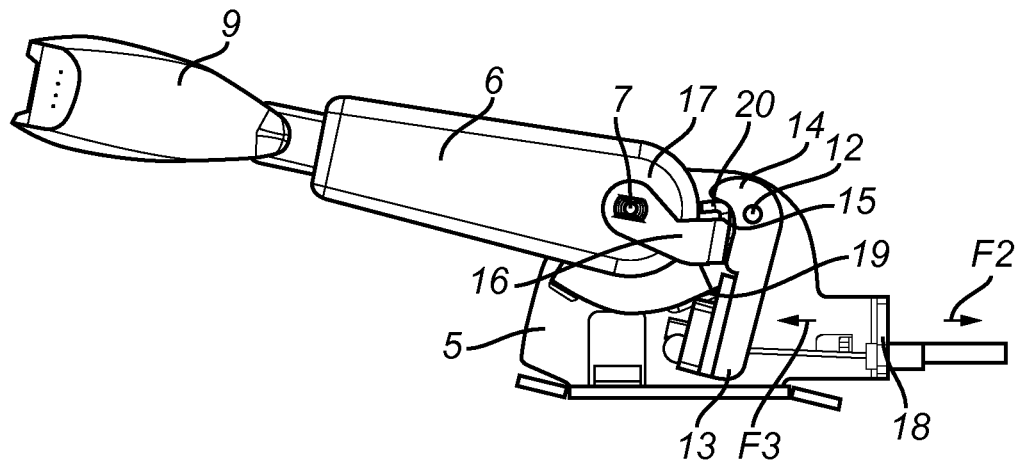
FIGS. 3A and 3B show a cross sectional view of an actuator in accordance with the invention.
Figure 3B:
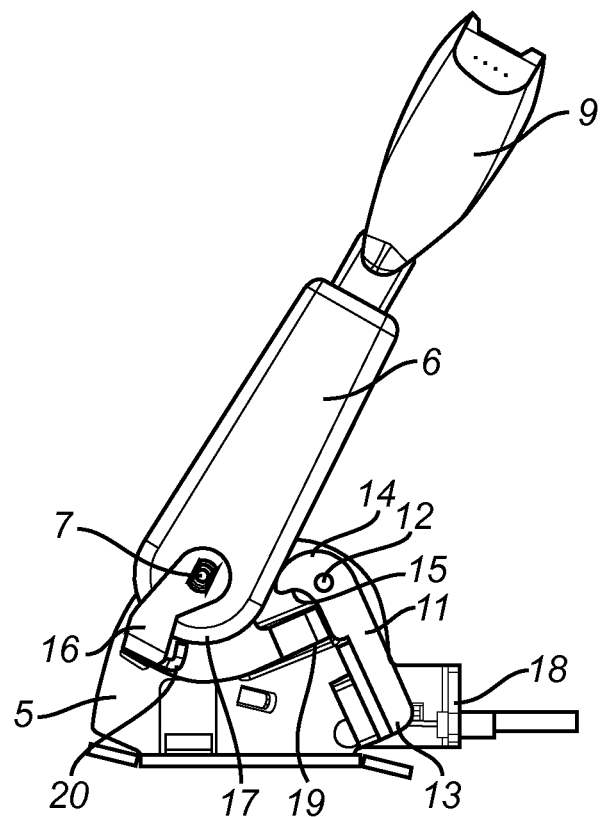

FIGS. 3A and 3B is a partially sectional viewing of the housing 5 and the actuator arm 6, where FIG. 3A shows the actuator arm in its flat position while FIG. 3B shows the actuator arm 6 in its upright position.

The housing 5 may further be provided with a release arm 11, which is pivotally connected to the housing 5 via pivot point 12, and where a first end 13 is attached and secured to the cable 8 and the second end 14 is provided with a curvature 15. The actuator arm may be provided with a torque member 16, that is connected to the actuator arm 6 and is immovable in relation to the actuator arm, and extends from a bottom end 17 of the actuator arm. When the actuator arm 6 is pivoted, the torque member 16 follows the movement of the actuator arm, and where the torque member may share the same pivot point 7 as the actuator arm, and extend along and beyond the longitudinal axis of the actuator arm in a direction away from the pivot point.

When the actuator arm 6 is in its upright position, as shown in FIG. 3B, the torque member 16 is positioned away from the release arm 11, and does therefore not apply any force to the release arm 11, and the release arm is maintained in its locked position, where the first end 13 of the release arm 11 is rotated in a position close to the cable attachment 18 of the housing 5. The cable 8 may be spring loaded with a force F2 which ensures that the release arm 11 is maintained in the locket position when the actuator arm 6 is in its upright position.

When the actuator arm 6 is rotated into its flat position (shown in FIG. 3A) via the pivot point 7, the torque member 16 rotates with the arm in a direction towards the release arm 11, so that the torque member 16 comes into contact with the release arm 11 and moves along a first surface area 19 of the release arm 11, until a contact surface 20 it comes into contact with the curvature 15. When the contact surface 20 of the torque member 16 comes into contact with the curvature 15, the contact surface 20 applies a force to the curvature, which is higher than the force F2 applied via the cable 8 which causes the release arm 11 to pivot, and the first end 13 moves in a direction away from the cable attachment, which causes the first end 13 to pull onto the cable 8 at a force F3. The pulling force F3 is larger than the spring force F2, which causes the cable to activate the second state of the release mechanism, allowing the retractor device to move the tensioning web in two directions as shown in FIG. 1B.

When the movement of the actuator arm 6 is reversed, the torque member 16 slides away from the curvature 15, and allows the release arm 11 to return to its locked position as shown in FIG. 3B.

FIGS. 4A and 4B show the actuator arm 6 in its upright and flat position, respectively. The housing 5 may further be provided with a securing member 21, which is adapted to secure the release arm 11 in its locked position (FIG. 4A) when the actuator arm 6 is in its upright position. The securing member may be a resilient member, that is adapted to be in its natural position on the same plane as the release arm 11, where a free end 22 of the securing member 21 will be coupled to the first surface 19 of the release arm 11, ensuring that the release arm is prevented from pivoting in the direction shown by arrow C. When the actuator arm 6 is moved into its flat position, shown in FIG. 4B, allowing the release arm to be pivoted to its open position (shown in FIG. 3A), the torque arm 16 may be adapted to resiliently force the securing member outwards from the plane of the release arm 11, and moving the free end of the securing member away from the release arm 11. Thus, when the free end has been forced outwards, the release arm 11 is free to pivot along its pivot point 12, and allowing the torque member 16 to force the release arm 11 into its position as shown in FIG. 3A.

When the actuator arm is moved back to its upright position, the torque arm 16 releases the force on the securing member, and when the release arm 11 returns to its locked position (shown in FIG. 3B) will resiliently return back to its natural position as shown in FIG. 4A.

FIG. 5A shows a side view of a retractor device 2, where FIG. 5B is a sectional view of the retractor device taken along axis I-I, FIG. 5C is a detailed view of the spring loaded cable 8 as well as the locking mechanism of the retractor device 2, FIG. 5D is a sectional view taken along axis II-II of FIG. 5F which is a front view of a retractor device, while FIG. 5E is a detailed view of FIG. 5D. The retractor device 2 comprises at least one release pin 28, where the release pin is in its first position (shown in FIG. 5C) maintains the retractor device in its second state, and prevents the retractor device from allowing the tensioning web to be pulled out of the retractor device. When the release pin is depressed into its second position (not shown) the retractor device allows the tensioning web to be pulled both ways.

FIG. 5F shows a front view of a retractor device 2, where the retractor device has a housing 25. The retractor device 2 of this example may be a retractor device having a first spool 30 arranged on a first side 32 and a second spool 31 arranged on a second side 33, where each spool is adapted to wind up and unwind a tensioning web (not shown). The housing 25 is adapted to surround the spools 30, 31, and to protect the tensioning web from the surroundings. The housing 25 may be provided with a first web opening 34 for the first spool 30 and a second web opening 35 for the second spool, allowing the tensioning web (not shown) to enter the housing 25 and extend out of the housing 25 to be wound and unwound. The retractor device in accordance with the invention may also comprise two or more separate retractors, that are not integrated.

FIG. 5C shows the proximal end 23 of the cable 8, which is attached to a release member 24. The release member is fixed to the retractor device housing 25 via a spring 26 (shown in FIG. 5E), where the spring pulls onto the release member 24 and thereby also to the proximal end 23 of the cable. The force applied by the spring, is force F2 (shown in FIG. 5E) as shown on the opposite end of the cable in FIG. 3B. The release member 24 is adapted to move along its longitudinal axis (parallel to the cable 8), so that when a force F3 is applied to the cable 8 (also shown in FIG. 3A) that is larger than F2, the release member moves in a direction towards the inner surface 27 of the device housing. The release member is adapted in such a way, when the release member passes the release pin 28, the release member pushes the release pin from its first position to its second position, and thereby activates the first state of the release mechanism. When the force F3 is released, the release member 24 returns to its normal position, ensuring that the retractor device and the release mechanism is in its second state.

The invention claimed is:

1. A harness system for a child safety seat comprising
at least one tensioning web;
a retractor device connected to a first end of the at least one tensioning web, the retractor device being configured to allow tightening of the tensioning web, thereby moving the tensioning web in a first direction, and the retractor device being configured to allow loosening of the tensioning web, thereby moving the tensioning web in a second direction;
a locking mechanism comprising a first locking part that is connected to a second end of the tensioning web, and a second locking part that is configured to mate with the first locking part and secure the first locking part to the second locking part;
a release mechanism connected to the retractor device, the release mechanism being configured to allow the retractor device to move the tensioning web in the first and the second direction when the release mechanism is in a first state, and the release mechanism being configured to prevent the retractor device to move the tensioning web in the second direction when the release mechanism is in a second state;
where the release mechanism further comprises an actuator that is connected to the release mechanism, where a movement of the actuator from a first position to a second position alternates the release mechanism from the first state to the second state, and vice versa,
wherein the actuator's position allows a user to identify whether the release mechanism is in the first state or in the second state,
where the release mechanism comprises a first release module and/or a second release module that is configured to be arranged in the base of the child seat, and
where the first release module is coupled to the second release module via a release cable that is adapted to transfer force applied in the first release module to the second release module and vice versa.

2. A harness system in accordance with claim 1 where the release mechanism comprises a latch device positioned in the retractor device which in a first position secures the release mechanism in its first state and a second position secures the release mechanism in its second state.

3. A harness system in accordance with claim 1, where the release mechanism is resiliently biased in its second state.

4. A harness system in accordance claim 1, where the actuator is an elongated member having a distal end and a proximal end, where the proximal end of the elongated member is configured to be pivotally connected to the child safety seat and the distal end comprises the second locking part.

5. A harness system in accordance claim 1, where the actuator is spring loaded in such a way that when the actuator is released, it will automatically rotate into a position that activates the first state.

6. A harness system in accordance claim 1, where the release mechanism comprises a release arm that is adapted to be biased by the actuator and is coupled to the retractor device for securing the retractor device in its first state or in its second state.

7. A harness system in accordance claim 1, where the release mechanism comprises a security member that is separate from the actuator which in a securing position prevents the release mechanism to move into its first state when the actuator is in is second position, and in an open position allows the release mechanism to operate in its first state.

8. A harness system in accordance with claim 7, where the actuator is coupled to the security member and where the actuator is configured to move the security member from its securing position to its open position and vice versa.

9. A child safety seat comprising a harness system in accordance with claim 1.

\* \* \* \* \*